United States Patent [19]

Dowdell et al.

[11] Patent Number: 5,274,666
[45] Date of Patent: Dec. 28, 1993

[54] WIRELESS COMMUNICATION SYSTEM

[75] Inventors: Ed Dowdell, Massapequa; Dan Giacopelli, Deer Park; Alvin Taylor, Bayside; Rex Nathanson, Dix Hills; Ray Dzurney, Kings Park, all of N.Y.

[73] Assignee: Telephonics Corporation, Huntington, N.Y.

[21] Appl. No.: 779,019

[22] Filed: Oct. 16, 1991

[51] Int. Cl.⁵ .......................... H04K 1/00; H04B 1/40
[52] U.S. Cl. ................................. 375/1; 380/34; 455/51.1
[58] Field of Search .................... 375/1; 380/34; 455/49.1, 51.1, 53.1, 54.1

[56] References Cited

U.S. PATENT DOCUMENTS

| | | | |
|---|---|---|---|
| 4,747,158 | 5/1988 | Goldberg et al. | 455/54.1 |
| 4,841,544 | 6/1989 | Nuytkens | 375/1 |
| 4,972,431 | 11/1990 | Keegan | 375/1 |
| 5,016,257 | 5/1991 | Wolf et al. | 380/34 |
| 5,140,697 | 8/1992 | Igarashi | 455/54.1 |

Primary Examiner—Salvatore Cangialosi
Attorney, Agent, or Firm—Schweitzer Cornman & Gross

[57] ABSTRACT

A wireless communication system allow two-full two-way communication among a net or loop of stations. Each station is in direct communication with another member of the net such that a logical communication loop is created about the net. Each station combines its received signal with its own audio signal for retransmission to the next member of the loop whereby audio from said station is passed in turn to each of the other loop members. Transmission frequency hopping is utilized to insure system privacy and minimize interference with or from other loops operating in the same area. The system dynamically reconfigures itself to allow for the addition or dropping of a station without breakdown of the loop.

15 Claims, 20 Drawing Sheets

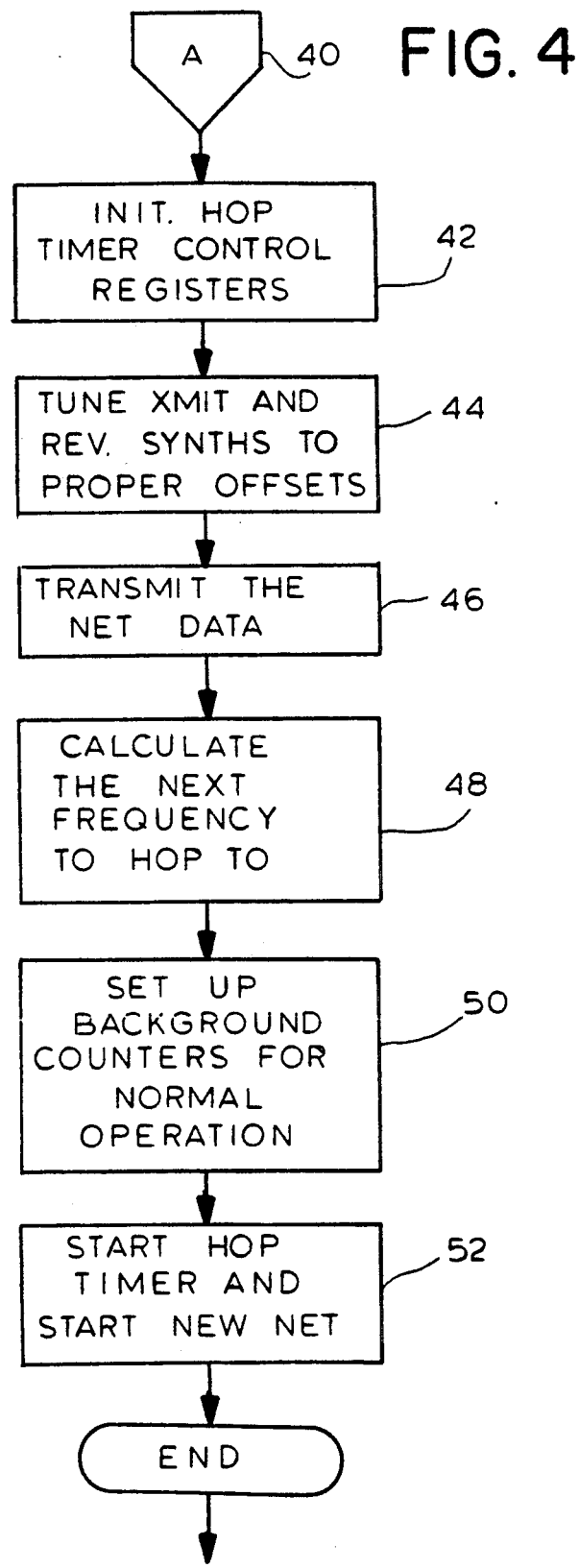

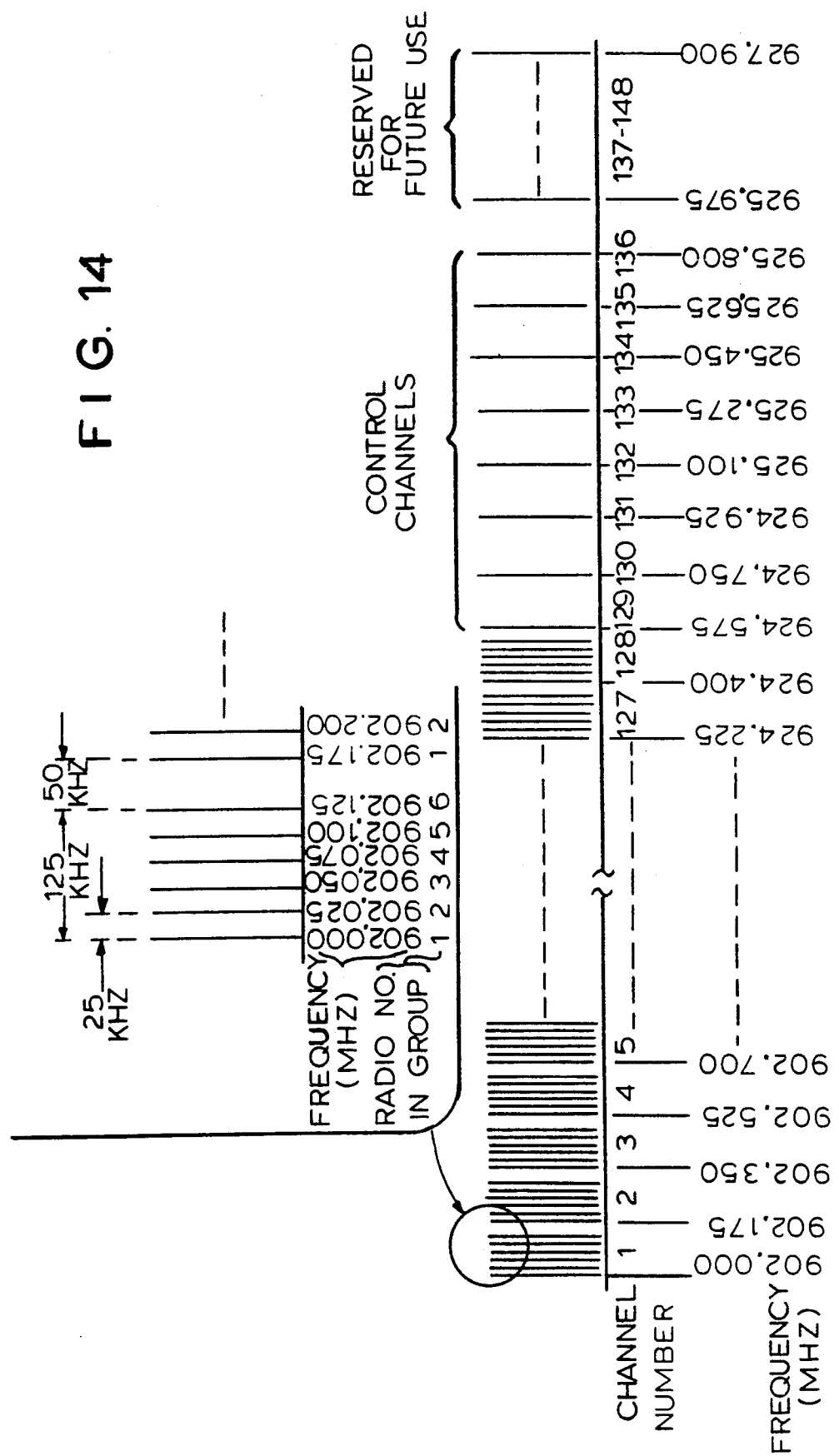

WIRELESS COMMUNICATION SYSTEM

The present invention relates to a wireless communication system and, in particular, to such a system which allows continuous full duplex communication among a varying number of stations.

BACKGROUND OF THE INVENTION

There are numerous applications for wireless communication systems which allow the continuous communication among a plurality of stations. In the military, for example, the members of a squad or platoon engaged in an activity require the continuous, uninterrupted ability to communicate with each and every other member of the group. Members of a Fire Department team similarly require the ability to contact the other members of the team while on assignment. In a commercial context, the individuals participating, for example, in the maintenance or repair of an aircraft may require a reliable system to allow their intercommunication, especially when visibility of and/or unassisted voice communication with team members is limited or impossible.

In the past, a typical multiple station communication system would typically consist of a master or base station with which each member or "satellite" station would communicate. The master or central station would pass communications from one satellite station to one or more of the other satellites as required. Alternatively, a plurality of stations could be tuned to the same transmit and receive frequency. In such a case, the transmission of one station would be simultaneously received by all other stations, but the commonality of transmission frequency interferes with simultaneous transmission. In the event more than one station was on the air at the same time, loss or distortion of signals would be inevitable.

The purpose of the present invention is to provide for localized group communication among a plurality of stations which allows simultaneous communication among and between all the stations of an operating group.

Another purpose of the present invention is to provide such a system in which intercommunication between stations is maintained on a continuing, automatic basis as the number of operating stations in the group increases or decreases.

Yet a further purpose of the present invention is to provide such a communication system which allows the operation of a plurality of groups in the same geographic area without interference or cross-talk between the groups.

Still another purpose of the present invention is to provide such a wireless intercommunication system in which a base system is unnecessary and thus mobility of all the stations is achieved.

An additional purpose of the present invention is to provide such a communication system which incorporates provisions to minimize the ability of intentional or unintentional monitoring or disruption of the conversations.

BRIEF DESCRIPTION OF THE INVENTION

In accordance with the above and other purposes, the present invention comprises a wireless communication system in which each station is assigned a specific and unique set of transmitting and receiving channels. The channels are so chosen that a "daisy chain" logical loop arrangement is created for the stations of an operating group or net, whereby a given station hears only the signal broadcast by the previous station in the chain and transmits only to the next station in the chain. Each station retransmits the signal it receives in combination with its own audio signal so that as the audio signals are propagated about the entire loop, means are provided to attenuate the audio signals as they travel about the loop to prevent continuous looping and unwanted feedback.

The transmission and reception frequencies of stations in a loop are adjusted dynamically to accommodate the entrance of a new station into the loop during operation. Similar means are provided to permit the loop to "close" when a member of the net ceases operation or is unable to maintain contact either with the transmitter which it receives or the receiver to which it transmits, either intentionally or by passing out of range of the related transmitters. Continuous communication is thus maintained on a dynamic basis during loop expansion and contraction. By use of frequency hopping, coordinated among each of the stations, the transmit and receive frequencies of the stations are varied, preferably in a pseudo-random pattern according to a formula known to the stations, to minimize the likelihood of third-party interception of the signals. The frequency hopping methodology further allows the simultaneous operation of a plurality of nets within the same geographical area, avoiding the likelihood of simultaneous use of the same frequency between conflicting groups, even when the groups are operating in the same frequency spectrum. In a preferred embodiment, audio noise reduction circuitry may be included to allow operation of the system in high noise environments.

BRIEF DESCRIPTION OF THE DRAWINGS

A fuller understanding of the present invention will be obtained upon consideration of the following, detailed description of a preferred, but nonetheless illustrative embodiment of the present invention when reviewed in conjunction with the annexed drawings, wherein:

FIG. 4 is a block diagram of the procedure whereby a new net is created by a station upon activation;

FIG. 14 illustrates a represented frequency band in which a net operating in accordance with the present invention may be located, in which the channel separation is depicted.

As seen in FIG. 1, the present invention is a wireless intercommunication system employing a logical loop or ring-transmission/reception structure, typically having up to six stations 10 through 20. Station 10 transmits on frequency f1, which is received only by station 12 which itself transmits on frequency f2. Station 14 receives station 12's broadcast on f2 and transmits on f3. This process continues about the loop, the last station, 20, transmitting on frequency f6 which is received by station 10 to close the loop. Preferably, such transmissions utilize frequency modulated signals, in the 902-928 MHZ band at low power. By the use of limited output power levels in that band, the system can be operated without licensing from the Federal Communications Commission.

Each of the stations demodulates the received signal to obtain the audio element and passes it to the station's earphones. The audio is also combined with the station's own audio signal, if any, typically the result of voice input through a microphone circuit, and retransmits the combination on its transmit frequency. As the composite audio signal travels around the loop, its level is reduced at each station prior to the time the new audio signal of the station is added. This causes the earlier-added audio components to effectively die out after one traverse of the loop, thus avoiding feedback and distortion problems.

Figure 1:
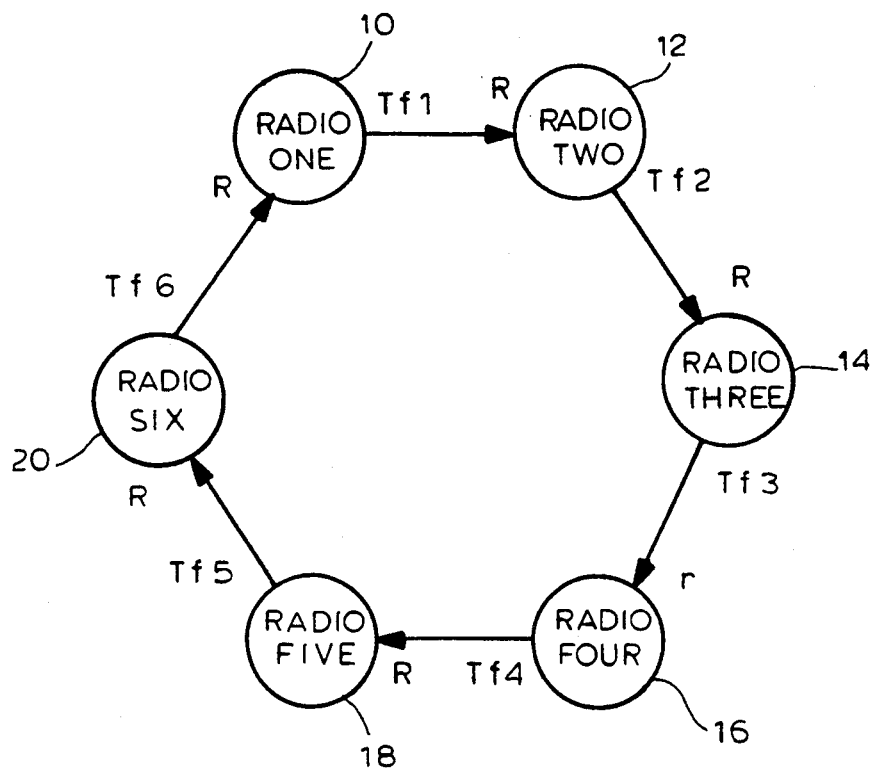
FIG. 1 is a representation of a communication loop according to the present invention.
Figure 2:
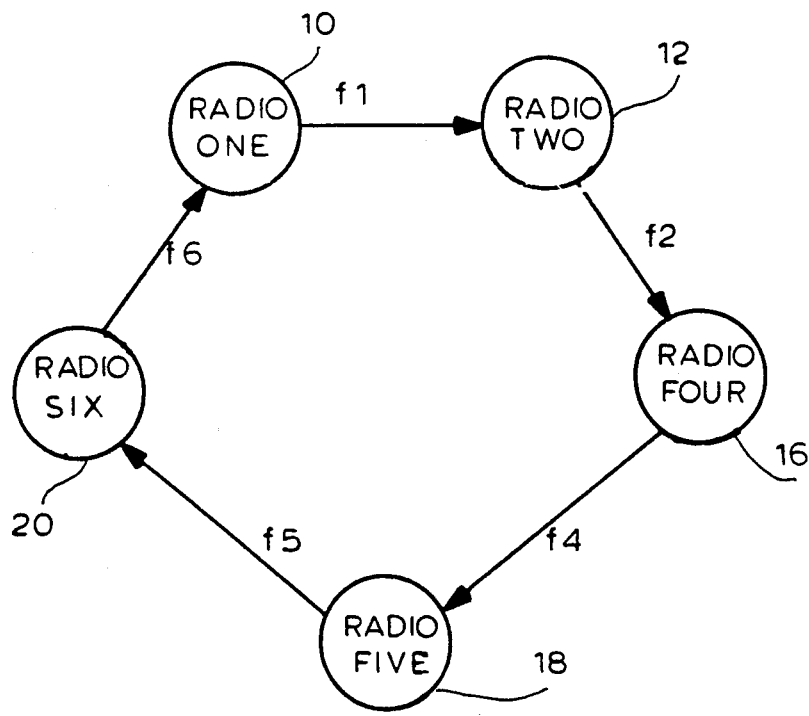
FIG. 2 is the communication loop of FIG. 1 in which a station has been dropped.

System logic allows the net to automatically reconfigure itself to permit the addition or loss of a station. As shown in FIG. 2, for example, the loss of the third station 14 results in following station 16 sensing the loss, whereby it automatically retunes itself to receive on f2, the transmit frequency of the preceding station 12. The addition of a new station similarly causes the reconfiguration of the net, whereby the reception channel of the station following the loop position of the new station is adjusted to receive the new station's broadcast and to preserve the integrity of the loop.

Each station of a net 22 transmits on an assigned set of frequencies defined by the net identification, which may either be preset or entered by the station operator. The frequencies of the stations in the net do not have to be adjacent but can be assigned anywhere in the allocated frequency band. To improve security and lessen the opportunity for interference, the frequencies vary or hop in synchronism, preferably in a manner determined by a pseudo-random number generator at each station. The seed or start number for the generator is fixed for the net, so that the jump frequency pattern is consistent across the net. In addition, a stable time base is provided such that the jumps are synchronized in time.

Figure 3:
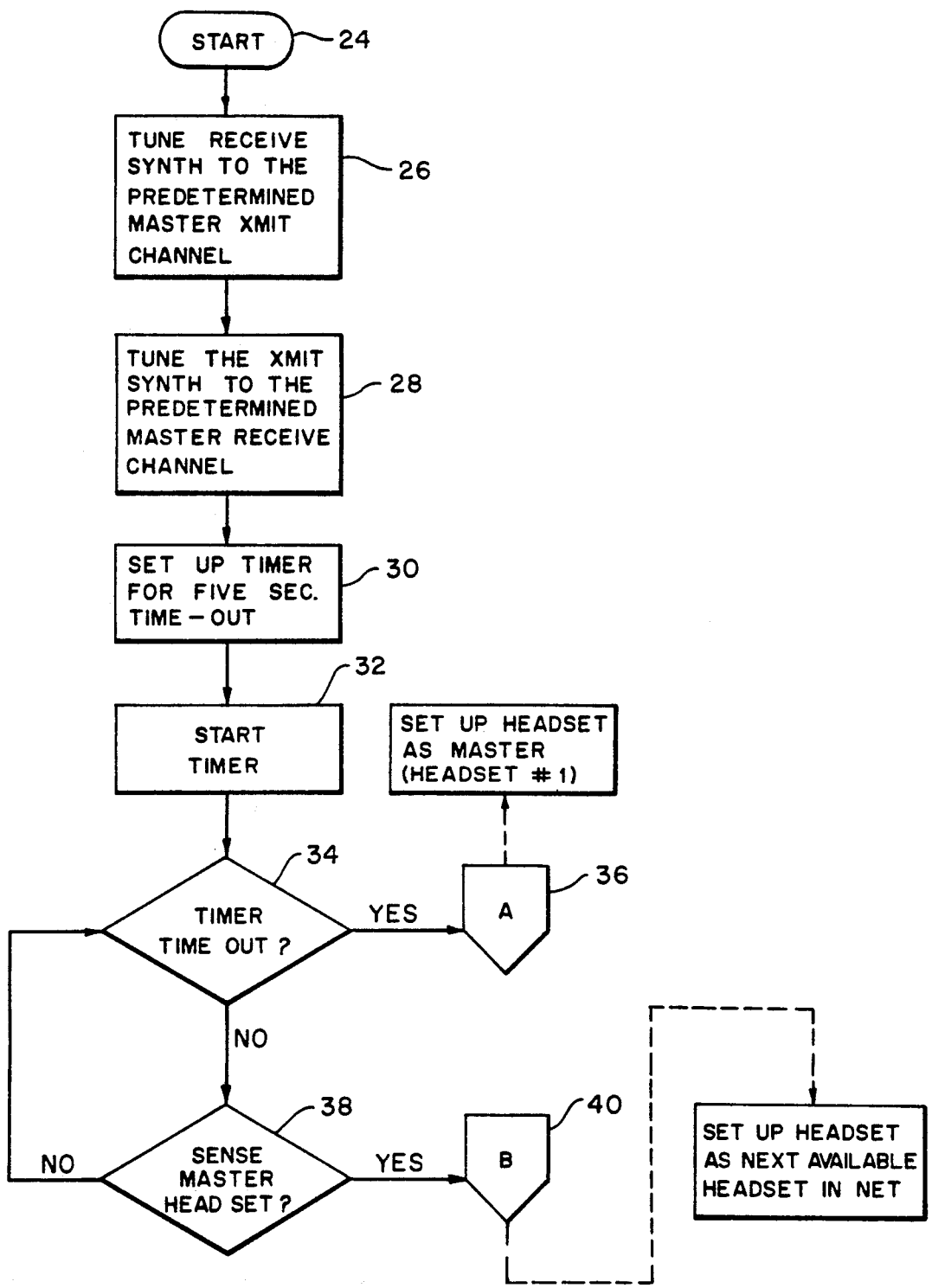
FIG. 3 is a block diagram of the procedure in which a station commences activity.

Detailed operation of the system is set forth in FIGS. 3 through 10, as follows:

FIG. 3 depicts the steps whereby a station transceiver is energized and is configured to join or create a new net. The unit is powered up or energized at 24, at which time a self-test routine may be run to determine battery levels and operability of system components. After successfully performing the tests, the station's receiver is tuned to the predetermined "master" frequency or channel where net information would be broadcast by the "master headset" of a preexisting net to which the station belongs. By definition, the "master" is simply the first station of the net on the air. For a given net, the master transmit frequency for system data is known to all stations of the net. Subsequently energized stations determine the presence of an earlier-energized station by examining this known master frequency, and configure themselves accordingly.

With its receiver tuned to the frequency on which the master transmission would emanate, the energized station tunes its transmitter at 28 to a second predetermined frequency on which the master station receives new station transmissions, and generates a transmission carrier. The carrier serves as a beacon to the master station (if any) to advise the master that a new station is attempting to join the net. Upon reception of this beacon signal, the master enters a routine that results in the broadcast of net data on the master frequency. The precise time required for the broadcast to commence depends on the logical position of the master station in its transmission routine. Accordingly, the station attempting to join the net sets a timer at 30 to a five-second interval and listens for the signal of the master during that period.

As the timer begins its countdown at 32, a logical loop is entered at 34. If the timer times out without the station's received signal strength indicator (RSSI) indicating that a master station signal is received, the new station assumes that there is no net to join and thus it is to be the master of a new net at 36. If the presence of a master station is sensed, the loop is halted and the acquiring unit goes through the procedure in an attempt to join the predetermined net at 40. The five-second loop period at 30 is chosen to allow a master unit sufficient time to permit its transmitter to cycle approximately two full sweeps through the allocated frequencies that may be utilized by an active net, such that the master frequency will be activated at least once during the timing period.

If the timer times out without a master station being identified, the routine set forth in FIG. 4 is entered, wherein the new station becomes the master station for the new net. To do so, the hop timer control registers are initialized at 42. These registers control the timing for the frequency hopping for the station's receiver and transmitter and thus for all the additional units that will enter the net and which must be synchronized with it.

Hopping is preferably done on a periodic basis, every 131 ms, to a pair of new frequencies determined by reference to a pseudo-random number generator. Both the seed or starting number, as well as the present output of the generator, must be provided to the station of the net so that the hop sequence can be coordinated and synchronized. In addition, station frequencies are typically offset 150 khz from each other, and a joining station must know its offset. The required values are determined at 44. In the case of the master station, the station assigns itself the first net of frequencies, that is with a zero offset.

With the proper transmission and reception parameters established, master net data is broadcast at 46 to advise any station which may have been energized immediately after the master. Net data will also be broadcast upon receipt of a beacon signal from an entering station, as previously discussed and which will be explained in further detail in connection with FIG. 8. After the burst of net data is transmitted on the assigned master frequency, the next transmission frequency is calculated at 48. Counters are set for operation to record and calculate the time and frequencies of the next hop at 50 and the hop occurs at 52. The transmitter then hops from frequency to frequency as determined by the system logic as will also be explained in connection with FIG. 8. It has been found that resident times of 131,072 microseconds across a total of 128 channels in a pseudo random sequence of 32,768 hops creates a situation in which the likelihood of collision with a broadcast from a station of another net is insignificant. Utilizing such parameters, the pattern of hops is repeated approximately every 72 minutes of operation.

Figure 5A:
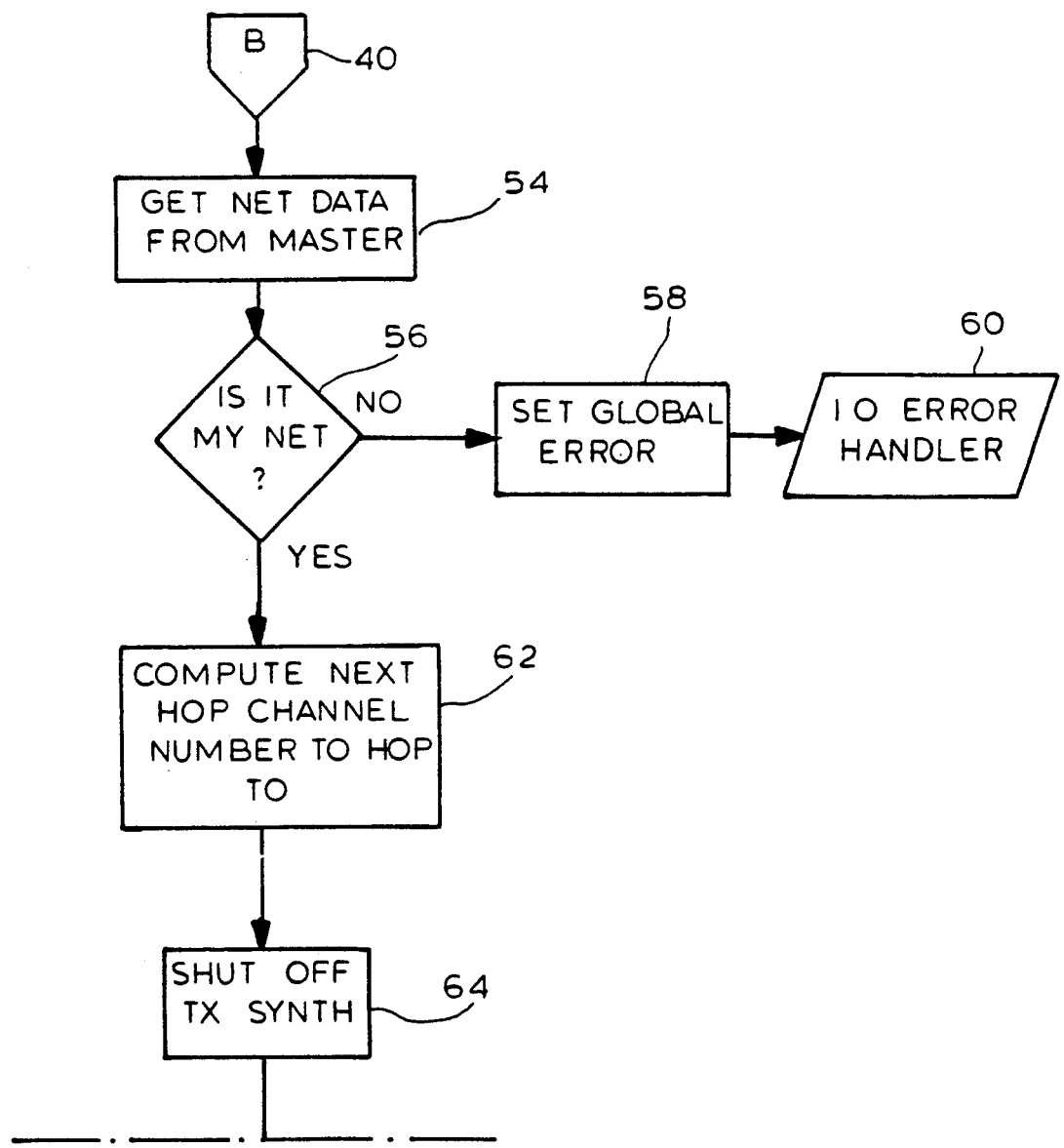
FIGS. 5A and 5B are block diagrams of the procedure in which a station identifies a net in operation.
Figure 5B:
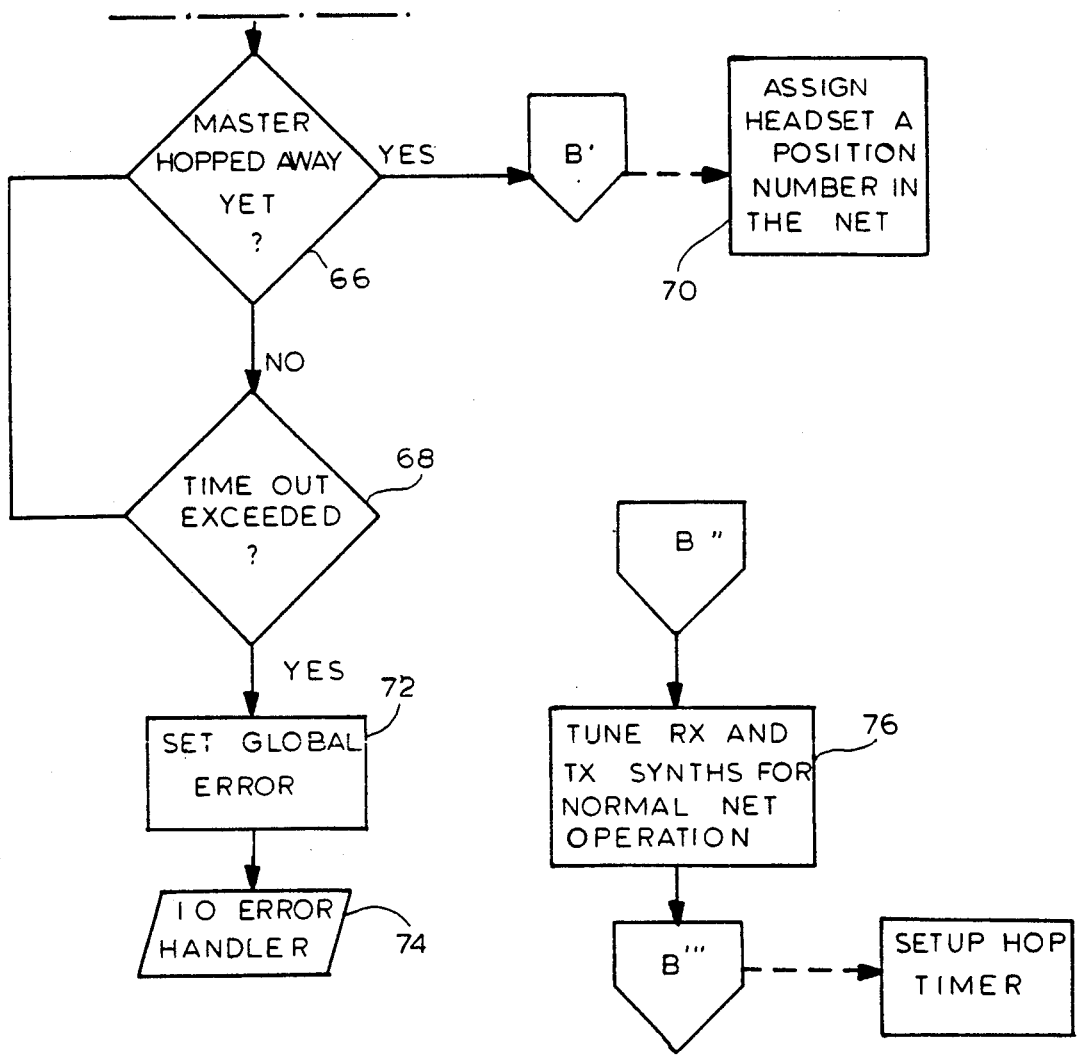

When the new station picks up the signal of a preexisting master station during its initial search as set forth in FIG. 3, the station attempts to join the net it has found, as set forth in FIG. 5. As depicted therein, the station receives at 54 the net data from the master station. This transmission includes the net number, which is compared at 56 with the net number stored by the acquiring station. This comparison is made to insure that the new station is attempting t join the net to which it is entitled to belong. In a multi-net environment this insures that, for example, all members of the refueling team are looped together, and that a member does not inadvertently become a member of the communications net for the de-icing crew. If the net numbers do not match, an error routine is entered at 58 and the joining process is aborted at 60. This can allow, for example, the operator to manually insert a new net number or recommence the inquiry process set forth in FIG. 3.

If the net identifiers agree, the new station utilizes the received seed number and present hop frequency data transmitted on the master frequency for its random number generator to calculate at 62 the next frequency in the channel hopping process for the net stations. The station shuts off its transmission frequency synthesizer at 64 which waits for the master station transmitter to hop away from the master channel at 66. When the hop is sensed at 70, the new unit retunes its receiver to the channel calculated at 62. If, on the other hand, the master does not hop away within a given time the procedure branches at 68 to set an error condition at 72 which is processed at 74.

Except for the time that the master headset is broadcasting net information on the master channel, each transmitter of each unit of a net is continuously broadcasting its carrier signal, whether or not an audio signal is present. Thus, the existence of such carriers provides a continuous indication of the number of stations active in a net. Since the net members are each located at set relative frequency positions, providing the hop number (i.e. the position along the frequency shift path) and a means for generating the frequency for the master station transmitter for any hop permits the assigned frequencies for any remaining stations to be calculated. At any hop, an examination of the assigned frequencies for the presence of a signal will thus determine the active members of the net.

Figure 6A:
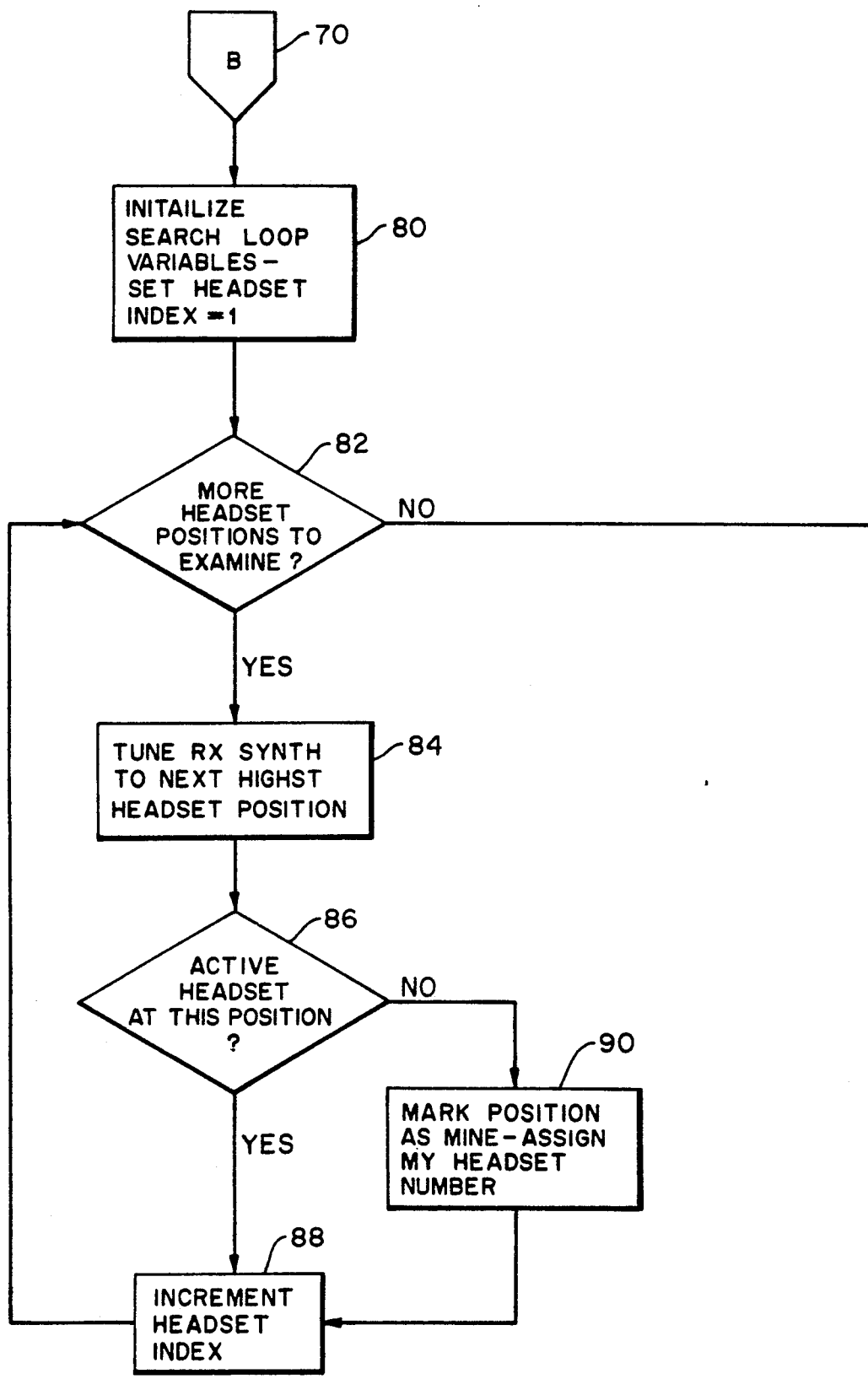
FIGS. 6A and 6B are block diagrams of the routine employed in which a station joins the net it has identified.
Figure 6B:
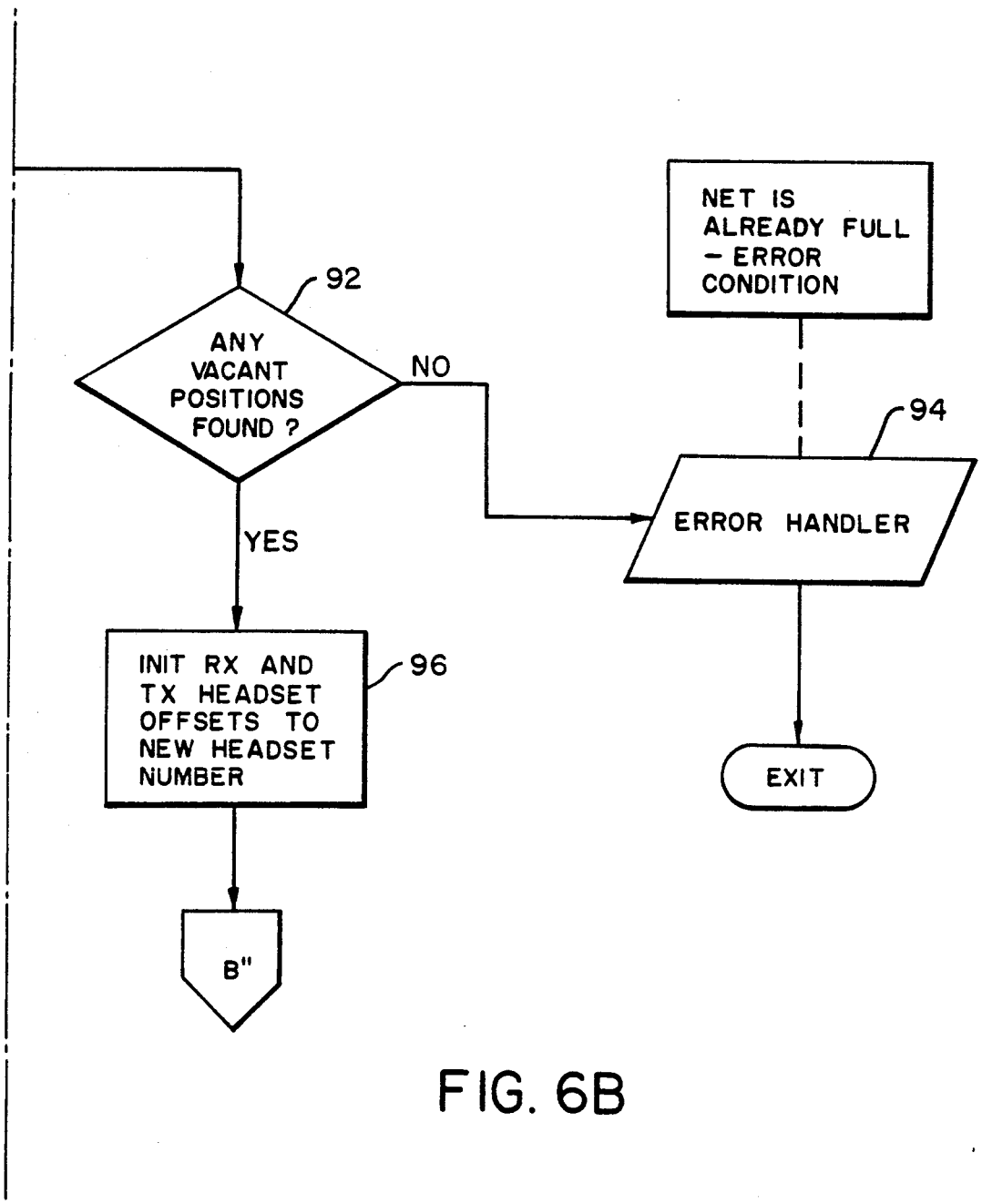

Accordingly, once the acquiring station tunes itself to the next frequency for the master station at 62 and determines that the master has hopped to that frequency at 66, the routine set forth in FIG. 6 is entered to identify the appropriate open position in the net for the acquiring station.

The routine commences by the acquiring station initializing at 80 loop variables to commence a search of each of the net frequencies corresponding to the hop channel for the net. The system is designed so that the maximum number of units, typically 6, for the net is known, such that the acquiring unit is aware of the number of frequency offset positions to be analyzed. The determination as to whether another frequency or loop position is to be examined is performed at 82. If another position remains, the station's receiver synthesizer is tuned to the next frequency at 84. The determination is then made at 86 as to whether or not a carrier is present, signifying that that position in the net is occupied. If it is occupied, the station index is incremented at 88, and the resulting value compared to the known number of stations at 82 to determine whether another station position is to be examined.

If an active station is not found at step 86, that frequency is preliminarily assigned to the acquiring station at 90. To insure that the position is truly vacant, and not unoccupied due to the temporary drop out of a station occupying the location, the remaining station positions are still checked to determine if additional frequencies are occupied. Accordingly whether or not an active station is found the station index is incremented at 88 until all positions are analyzed.

After all loop positions are examined as required, the procedure branches to 92 to determine whether, during the examination of positions, a vacant position was found. If no vacant positions were found, an error routine is initiated at 94. Typically, this would indicate that the net is already full and the acquiring station cannot be accommodated. In the normal course a vacant position will be indicated.

In order to minimize the risk that the new station is assigned a position already assigned but not sensed during the examination at 86, a determination is made as to the first available frequency following all occupied frequencies. That is, any gap between occupied frequencies will be ignored in the assignment routine. The station is assigned the appropriate transmitter and receiver offsets corresponding to the position at 96, the synthesizers are tuned at 76 (see FIG. 5) for proper operation, and the hop timer is set up and activated at 78.

Figure 7:
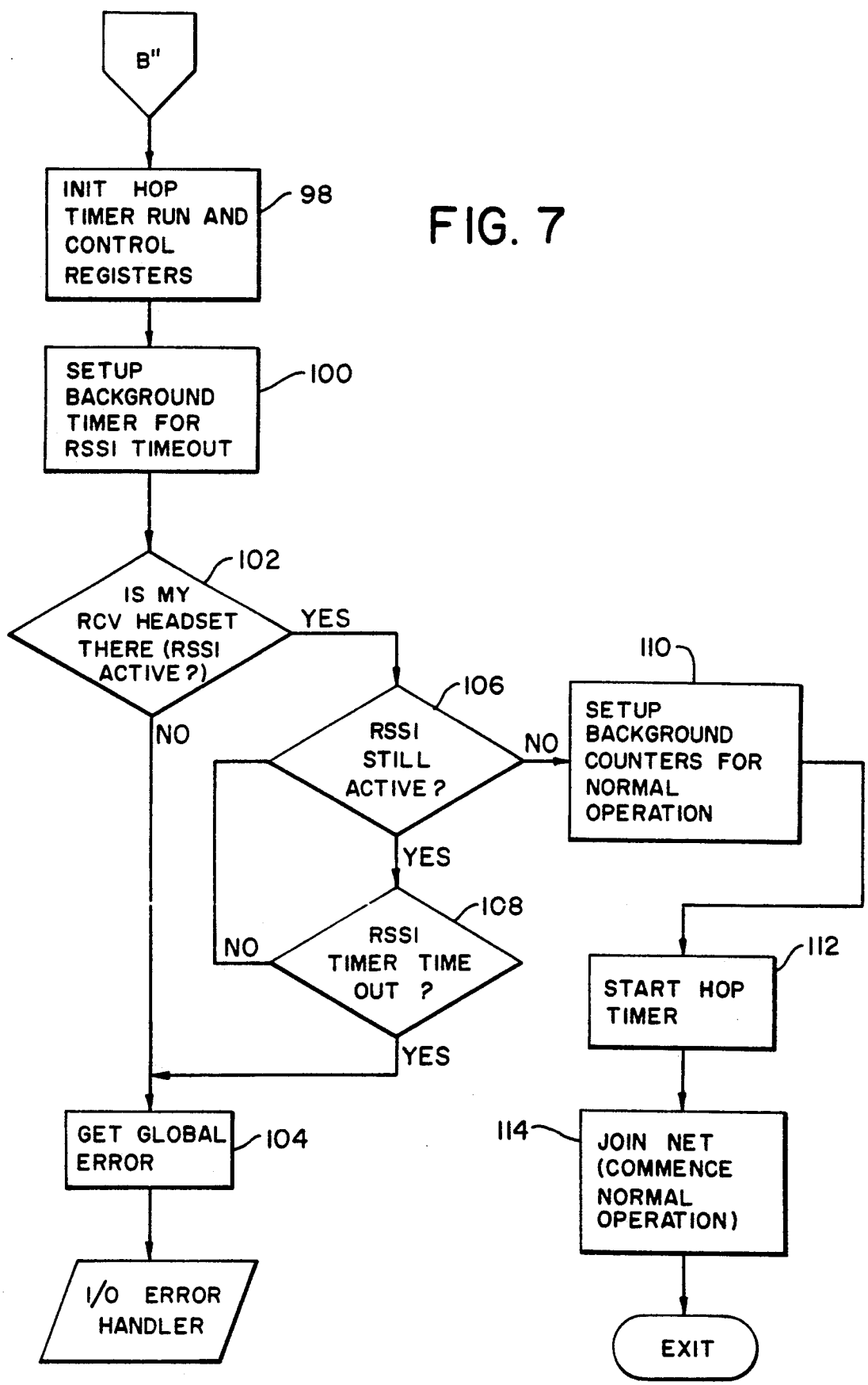
FIG. 7 is a block diagram of the procedure for synchronization of station timing between a net and an acquiring station.
Figure 8A:
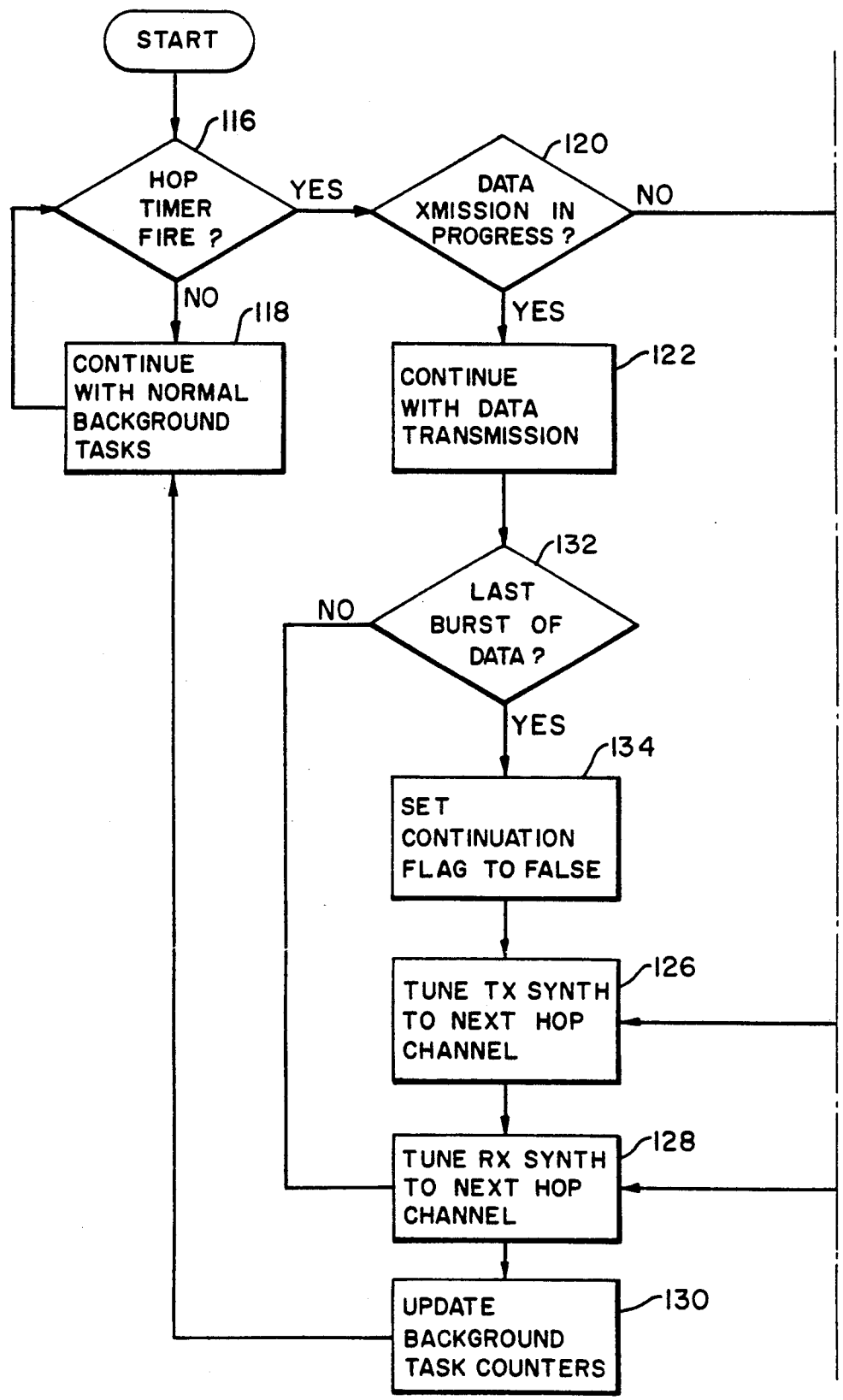
FIGS. 8A and 8B are block diagrams of the procedure utilized by a "master" station of a net to coordinate hopping with the broadcast of broadcast net data.
Figure 8B:
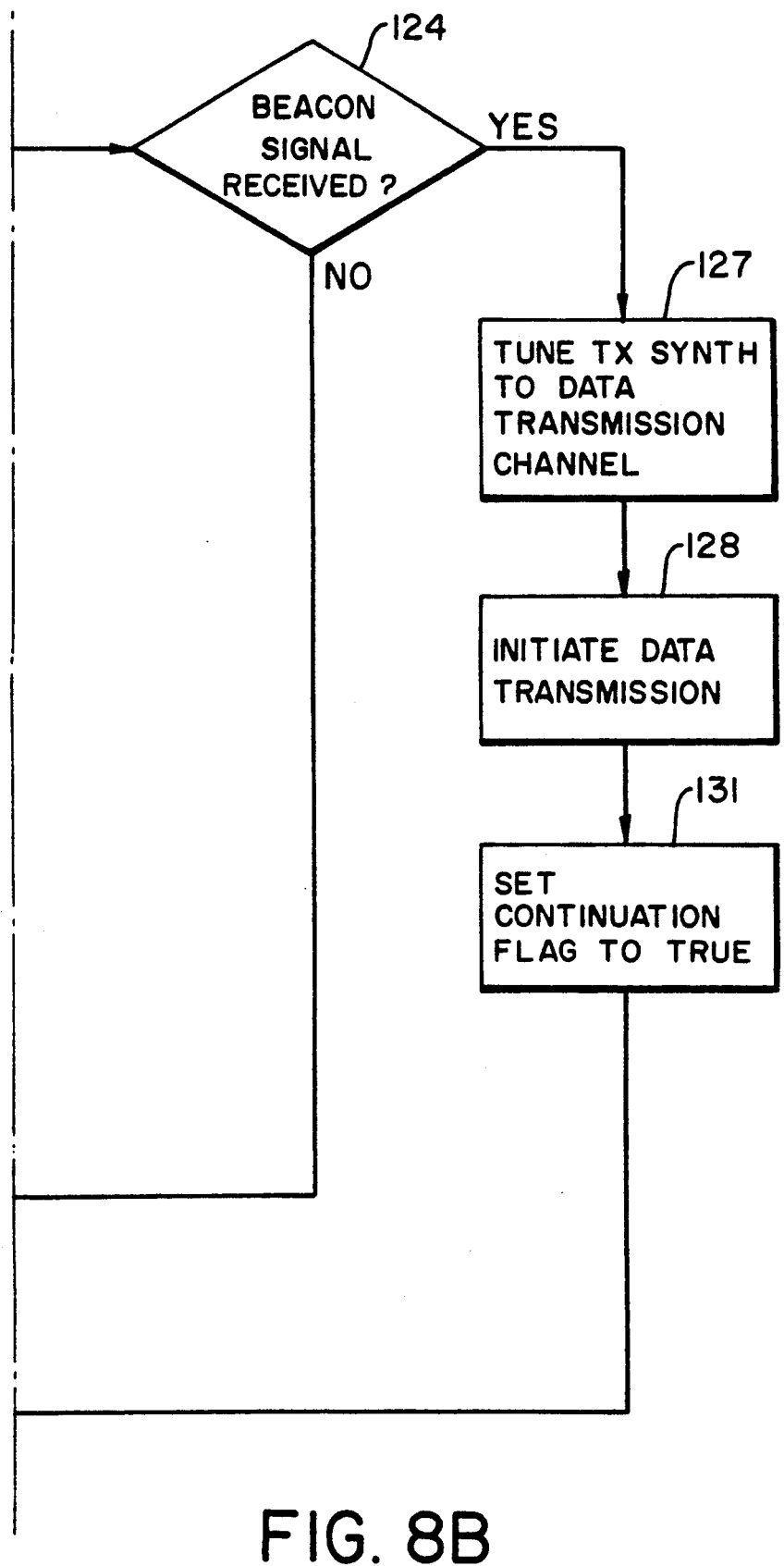

Once the appropriate transmit and receive frequencies are determined, the acquiring station must adjust its timing such that it will hop in synchronism with the other members of the net. The procedure by which this is done is depicted in FIG. 7.

This routine is commenced by initialization of the station's hop timer run and control registers such that they may be triggered upon receipt of an appropriate commencement signal. The station sets a timer at 100 to provide a time interval during which the station listens to determine whether the transmitter to which its receiver is tuned is active. Normally, a carrier is present, as the entry routine of FIG. 6 identified a carrier at the frequency. An initial examination is made at 102, however, to re-confirm the existence of the transmitting station. If it is not, an error condition exists and an appropriate routine is entered at 104. The length of the time interval is chosen to exceed residence time (131 ms) at a given frequency.

In the normal situation the carrier signal is present and thus the system loops at 106-108 for the duration of the timer set by 100. The station's RSSI is monitored for loss of signal, indicating that the transmitter to which the station is tuned has hopped to a new frequency. If the timer times out at 108 without loss of the signal, an error condition exists, and control again passes to the error routine 104. When the RSSI to which the station is tuned is no longer active, indicating that the transmitter to which the station is tuned has hopped, the loop exits to 110, the background counters being set for normal operation at 110, and the station's hop timer being set at 112. With the setting of the hop timer, the station is in synchronism with the hopping of the other stations, and normal net operation proceeds at 114.

As previously set forth, the stations each hop to a new channel every 131 milliseconds. During the residence period, each station may perform background tasks that require servicing, such as battery check, monitoring received, signal strength and the like. The background timers provide the time window to carry out the tasks. One of these background tasks is the calculation of the next channels to hop to in the sequence. This process preloads the frequencies so that when the hop occurs, the frequencies will be known and available. In the case of the master station, in addition to hopping among the audio channels, provision must be made for the inclusion of a hop to the master data channel. As may be recalled, an acquiring station causes this channel to be activated to allow net data to be received for net joining. The shift to this transmission frequency must be available for inclusion in the hop sequence without interrupting normal audio hop progression timing. The procedure utilized by the master station to incorporate the data broadcast is set forth in FIG. 8.

As shown therein, the master station's hop timer is monitored at 116 to determine whether the time for a frequency hop has arrived. The system continues to loop, awaiting the time, allowing background tasks may be performed during the interim at 118. When the hop timer fires, the procedure branches to 120, where a determination as to whether or not net data is being transmitted over the data channel is made. If so, this transmission cannot be interrupted by a frequency shift, and the procedure branches to allow the transmission to continue at the data frequency at 122.

If a data transmission is not in progress, the system branches to 124 to determine whether the time has arrived to commence transmission of net data. If so, transmission of audio on a hop frequency must be interrupted to permit such transmission. If a net data transmission is not required, normal audio channel broadcast operation continues, with the station's transmission synthesizer set to the next audio hop channel at 126, its receiver synthesizer tuned to the next channel at 128, and the background task counters being updated at 130 to allow the background tasks to be continued at 118.

If it is determined at 124 that a new station is attempting to join the net, signified by the reception of the new station's beacon signal, transmission of net data commences. Typically, the master station will tune its receiver to the beacon frequency on a periodic basis, approximately every 3 seconds, to test for the presence of a beacon signal. If it is found, the master station's transmitter synthesizer is tuned to the net data transmission channel at 127 and the data transmission is initiated at 128. A flag is set at 131 to denote the commencement of the data transmission process. As the broadcast of net data does not affect the continued reception and transmission of audio by the remaining net stations, the master station's receiver is still retuned at 128 to the next audio hop frequency. The background tasks also proceed until the next hop is scheduled to occur as monitored at 116.

At that time, if the data transmission has not been completed, the data continuation flag set at 130 remains set and the procedure branches at 120 upon sensing thereof to allow the transmission to continue on the data transmission channel at 122. The transmitted data is then analyzed to determine whether or not transmission will be completed prior to the time that the next hop is scheduled. Thus, the procedure determines at 132 whether the portion of the net being transmitted is the termination of the transmission. If it is not, the data transmission is continued, with the station's receive channel synthesizer tuned to the next hop channel at 128.

If it is determined that the data burst is the terminating burst, the data continuation flag is set to false at 134 and the station's transmit synthesizer is set to the next audio hop channel, allowing the station to hop thereto at the next command. Typically, net data transmission will take three bursts to complete, for a total transmission time of approximately 390 milliseconds.

Figure 9:
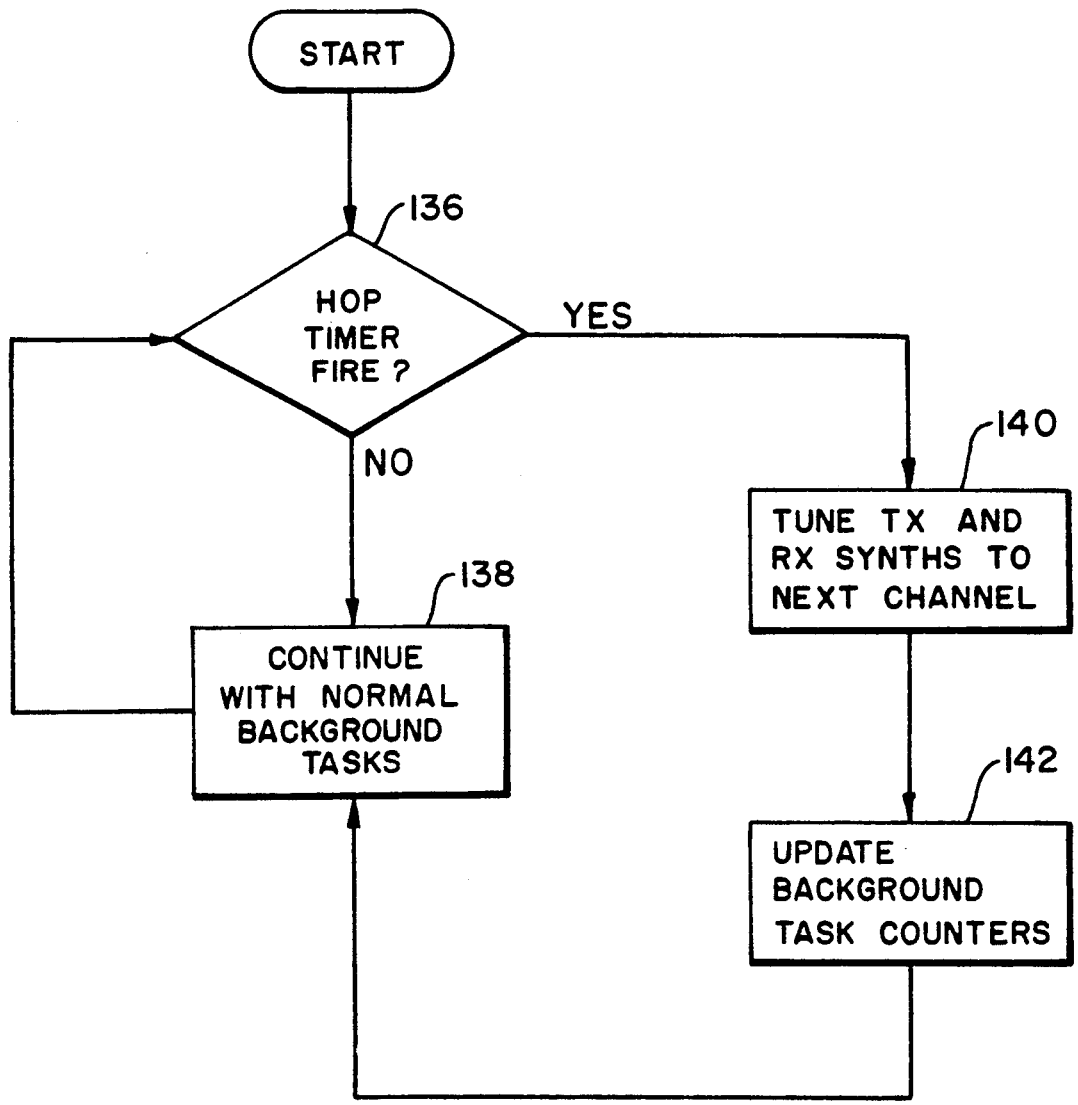
FIG. 9 is a block diagram of the procedure utilized by a non-master station to hop from frequency to frequency.
Figure 10A:
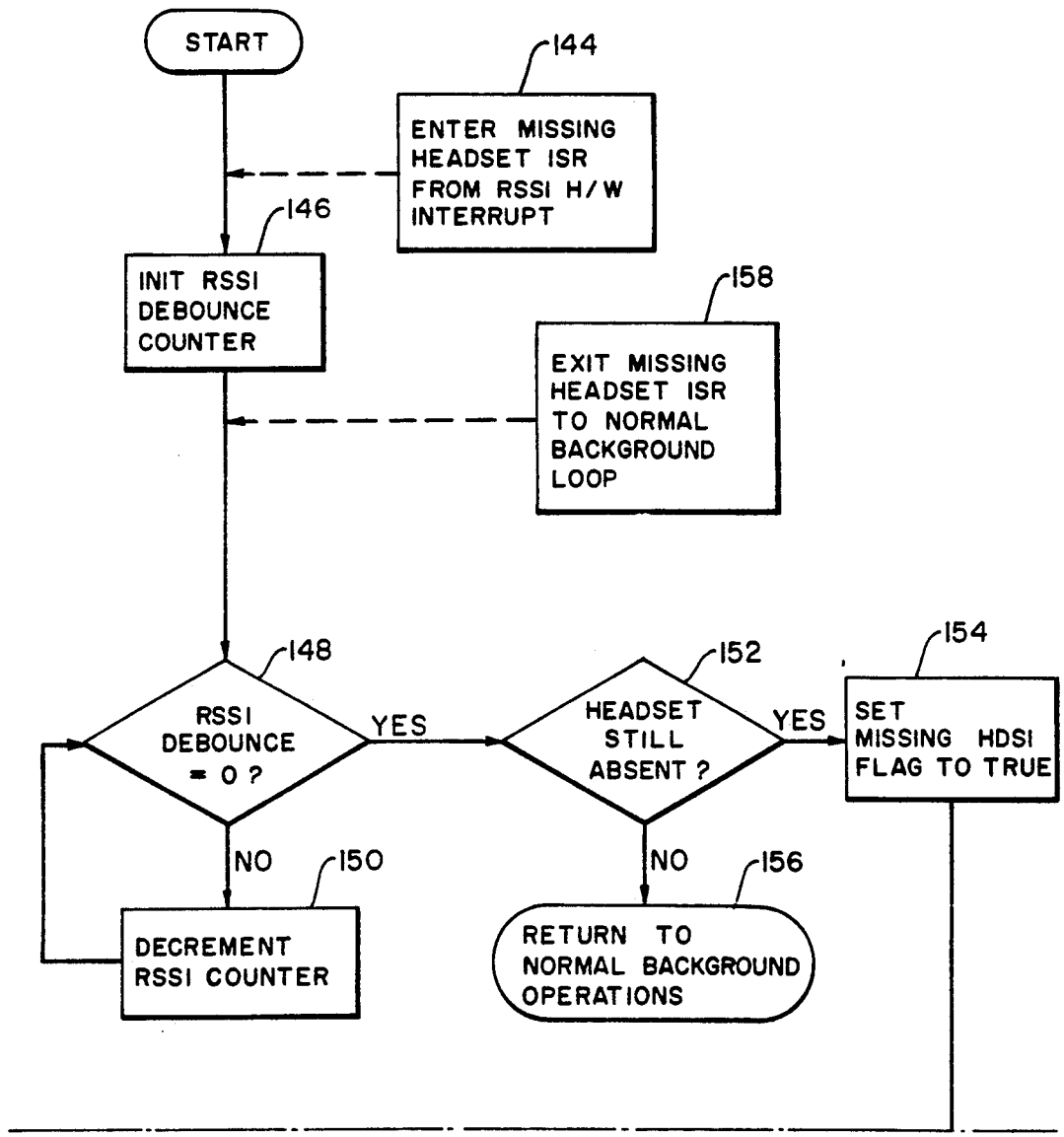
FIGS. 10A and 10B are block diagrams of the procedure for reconfiguring a net upon loss of a member station.
Figure 10B:
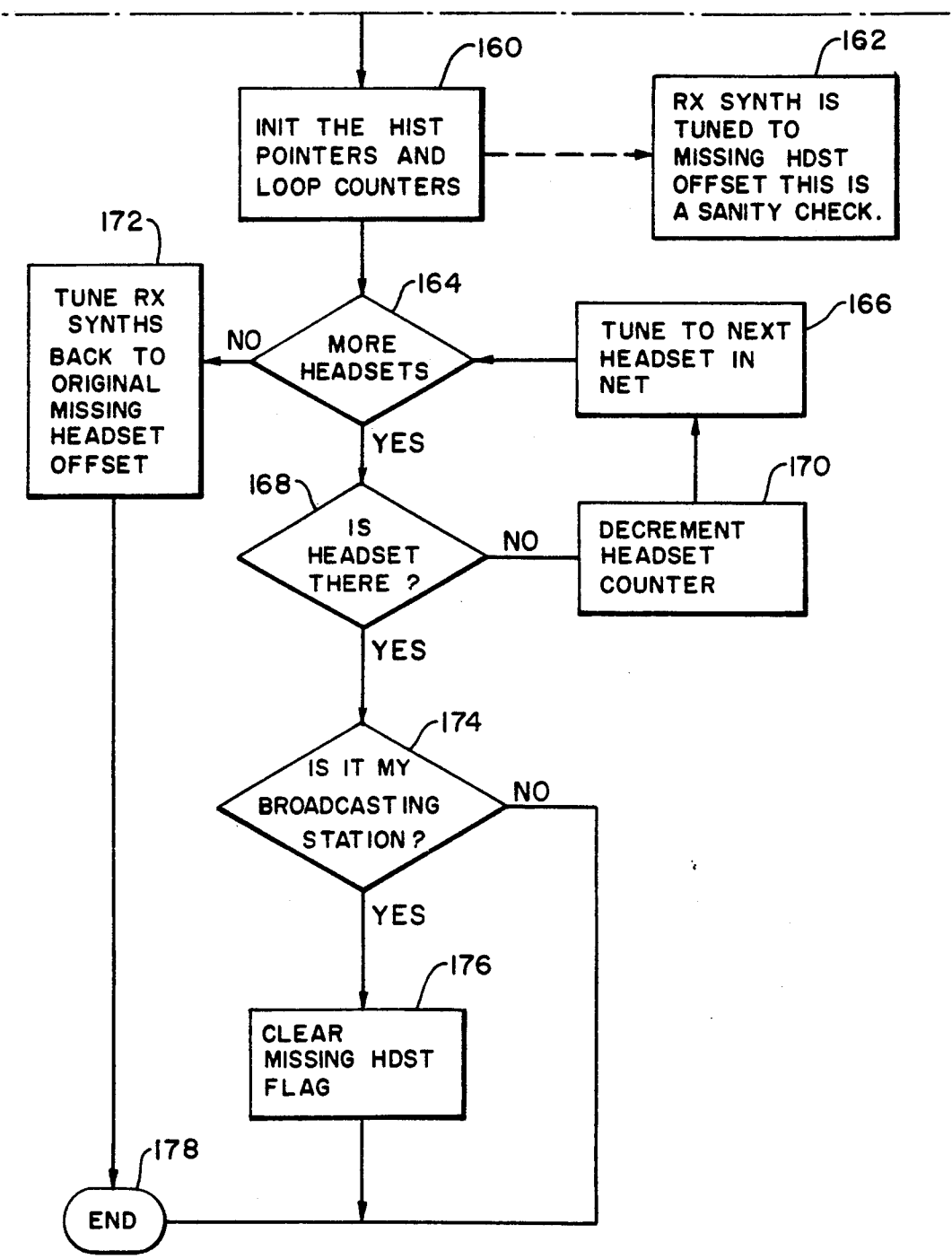

A similar procedure is utilized to perform hop execution in a non-master station of a net. This procedure is set forth in FIG. 9 showing that the station determines at 136 whether its hop timer has fired, cycling and allowing station background tasks to proceed at 138 until firing, indicating a hop is to be performed. At that time, the procedure branches to 140, where both the transmit and receive frequency synthesizers are set to the new channel. The background task counters are updated at 142 to allow the background tasks to continue, and such tasks are continued at 138.

In normal operation, each member station of the net is in direct communication with the following member and the transmission and reception loop maintains its continuity. Such continuity can be disrupted, however, either because one member of the loop has passed out of range of its adjacent members, or has shut down, either inadvertently or intentionally. In such a case, the loop must be reconfigured to maintain communication without the dropped station. This procedure is set forth in FIG. 10.

This procedure commences at 144 when a "missing station" signal is generated as a result of the station's RSSI failing to indicate the necessary received signal strength to confirm the presence of the transmitting station. Counter 146 sets a time period in which the station awaits re-reception of the signal. Instantaneous loss of signal may be due to a system "glitch", a lost data pulse, or the like, and this delay, before further steps are taken, insures that the loss of signal was not a transient event. The counter loops down at 148, 150. At the end of the timing period a check for the missing transmission is again made at 152. If the headset signal has reappeared, normal background operations continue at 156. If the station is still absent, a "missing station" flag is set to true at 154 and headset pointers and loop counters are initiated at 160.

It is to be recognized that the countdown loop of 148, 150 may be shut down and exited at any time during the timing cycle if the RSSI indicates return of the missing carrier. In such a case, normal operation is re-established at 158.

The station pointers and loop counters allow the station's receive frequency synthesizer to be retuned to the transmission frequencies of the remaining units on a stepwide basis. At this time, the station's receiver synthesizer is retuned at 162 to the missing station's offset to insure that the transmission is indeed not present and that the failure to receive was not the result of an improperly tuned receiver.

The station transmission frequencies are then scanned, on a stepwise basis, beginning with the missing transmitter, backwards around the next loop. A determination is made at 164 if the scan is completed. If it is not, the next frequency is checked for the presence of a carrier at 168. If a signal is found, the frequency is compared to the frequency for the missing station at 174. If they match, signifying that the "missing" station has returned and is again operating, the missing station flag is cleared at 176 and the routine is terminated at 178 allowing normal operation to continue. If a signal is found at a frequency other than that of the "missing" station the missing headset flag remains set, the station adopting the found station's frequency for reception, the routine similarly exiting at 178. Because the missing station flag is still set, however, it permits the station to re-enter the missing station routine after a pre-defined number of background cycles are performed. This causes the station to periodically check for the reappearance of the missing station and return to that frequency.

If the station search loop terminates at 164 without finding another active station, the procedure branches to 172. Such a case typically occurs when the searching station itself has "left" the loop, and is unable to communicate with any remaining units. In such a situation the station retunes itself to its original reception frequency at 172, terminating the routine at 178 whereby the unit again performs the scan after a predetermined number of background cycles, as the missing station flag remains set.

The above functions may be preferably monitored and carried out by use of a microprocessor system with an 8-byte capacity. Each station has its own microprocessor, and timing may be controlled at each station by a temperature compensated crystal oscillator which is also utilized to generate a reference frequency for the frequency synthesis circuitry as known in the art.

Figure 11:
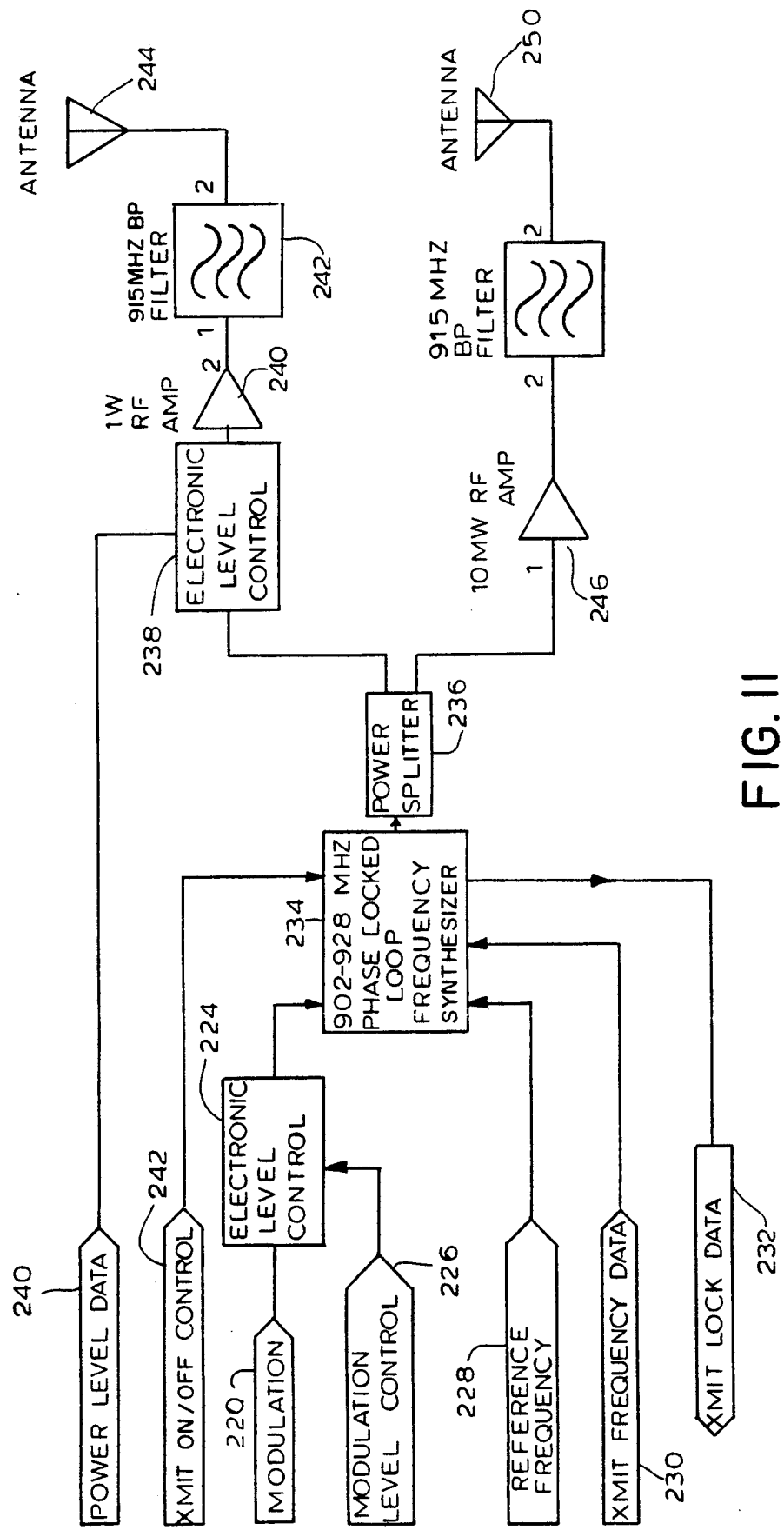
FIGS. 11, 11A, and 11B are block diagrams of the transmitter circuitry for the invention.
Figure 11A:
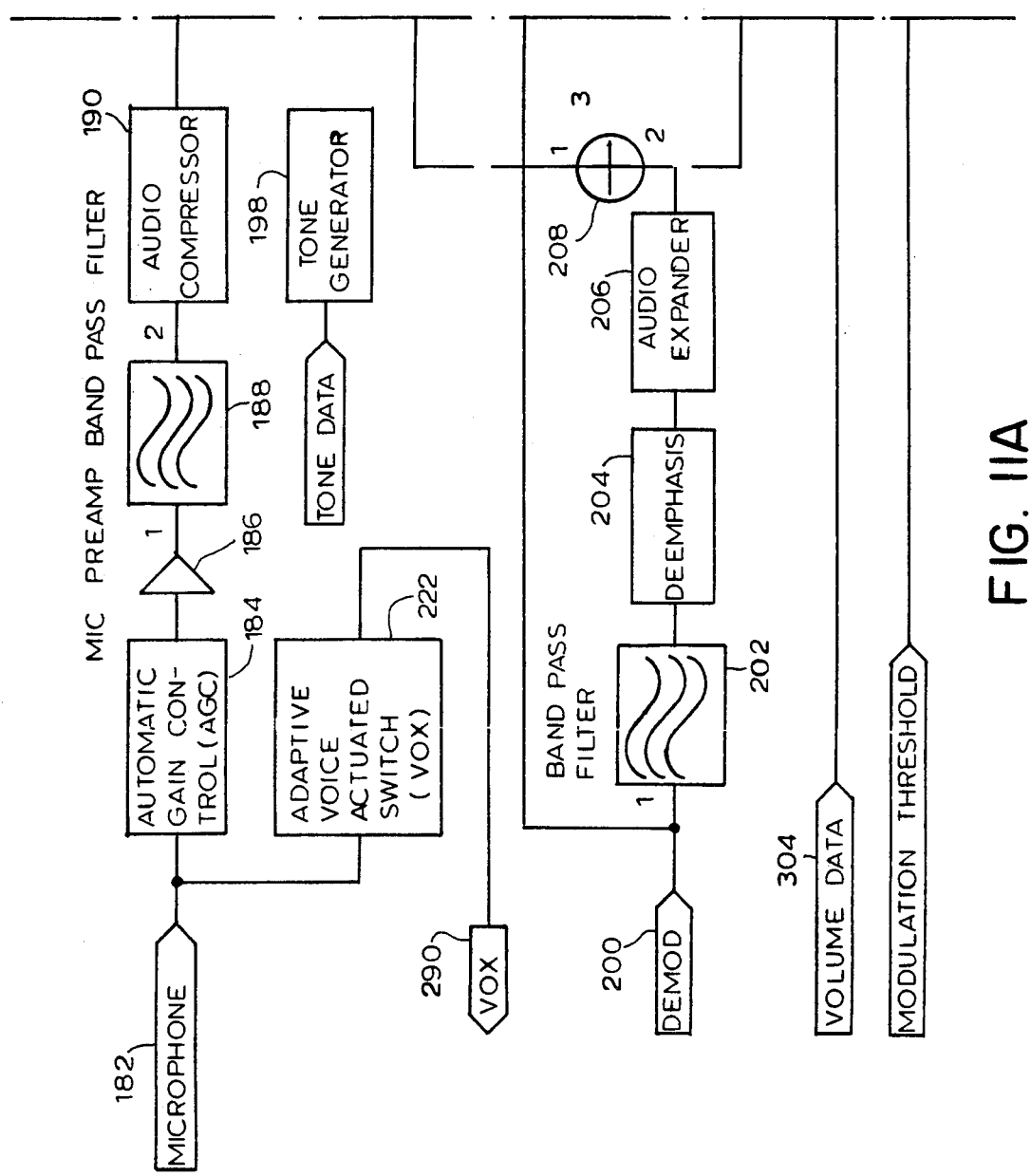
Figure 11B:
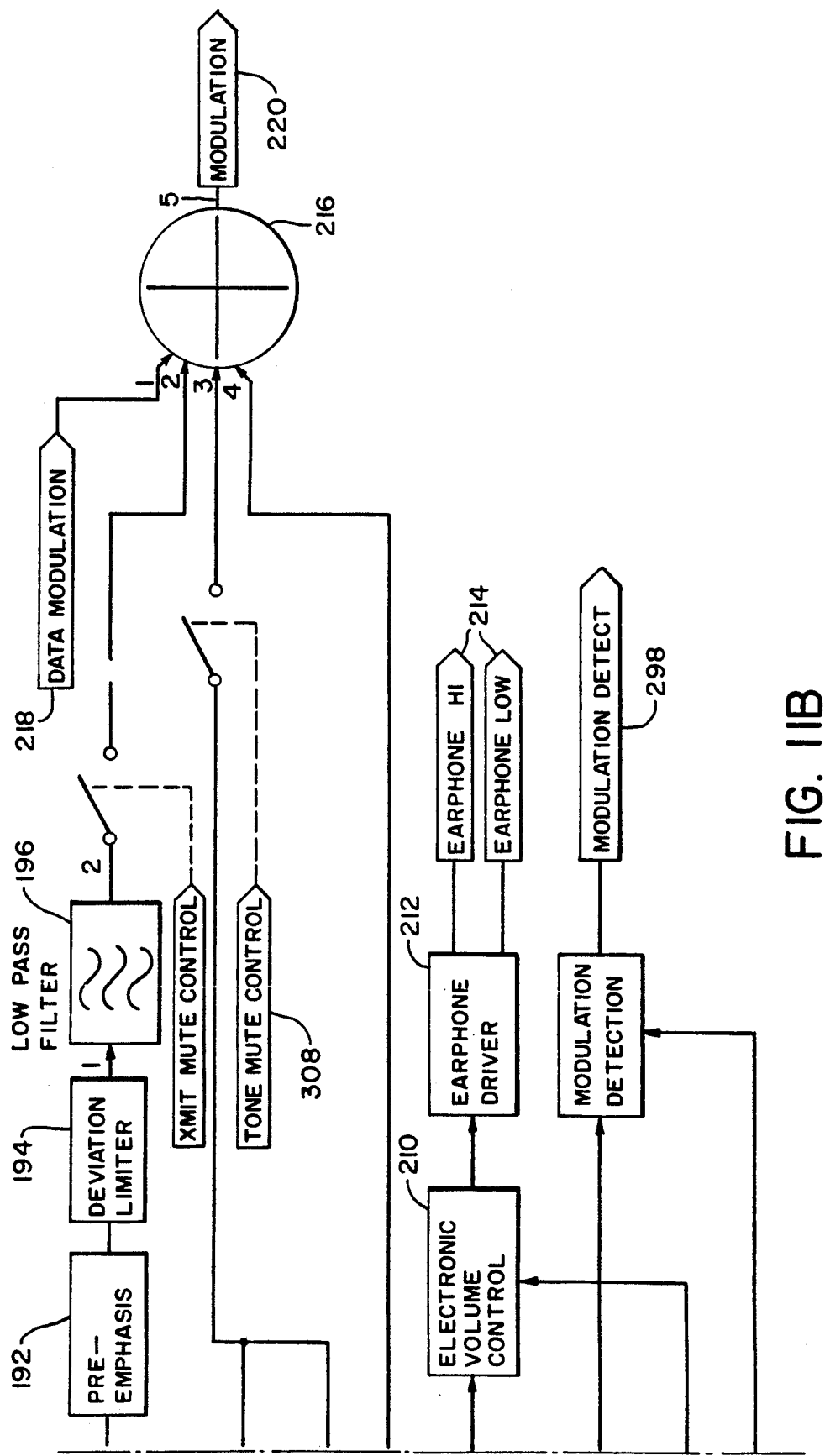

As shown in the block diagram of FIG. 11, the audio signal is developed by audio processor circuitry 180. The processor includes a microphone 182 coupled to the series arrangement of an automatic gain control 184, a preamp 186, a bandpass filter 188 to eliminate extraneous noise picked up by the microphone, and further audio conditioning circuitry, including compressor 190, pre-emphasis circuitry 192, deviation limiter 194 and a low-pass filter 196, all as known in the art. The ability to transmit tone data may be provided by a tone generator 198, which may be provided with input from an appropriate source, either a keypad or microprocessor output.

Figure 12A:
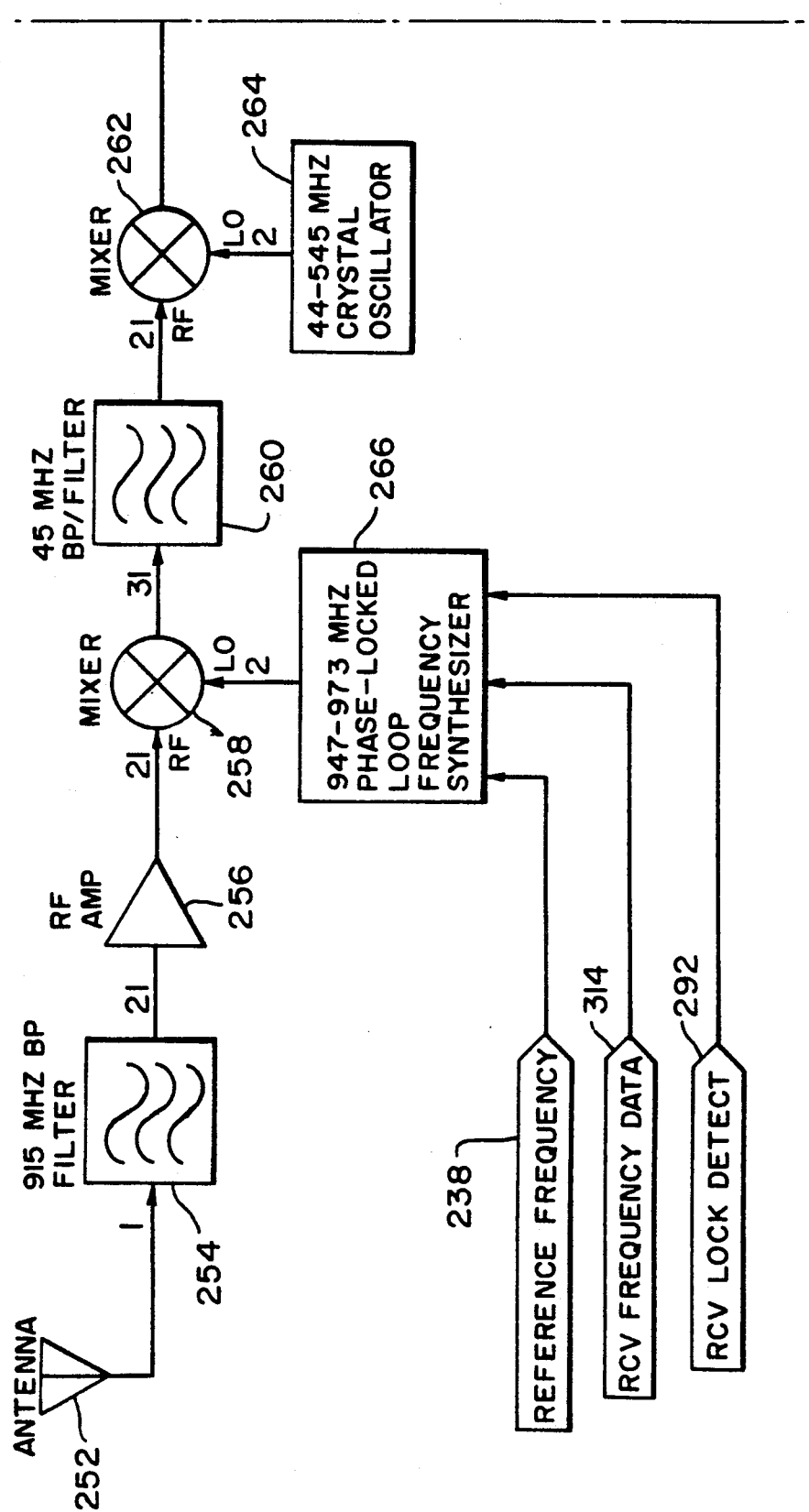
FIGS. 12A and 12B are block diagrams of the receiver circuitry for the invention.
Figure 12B:
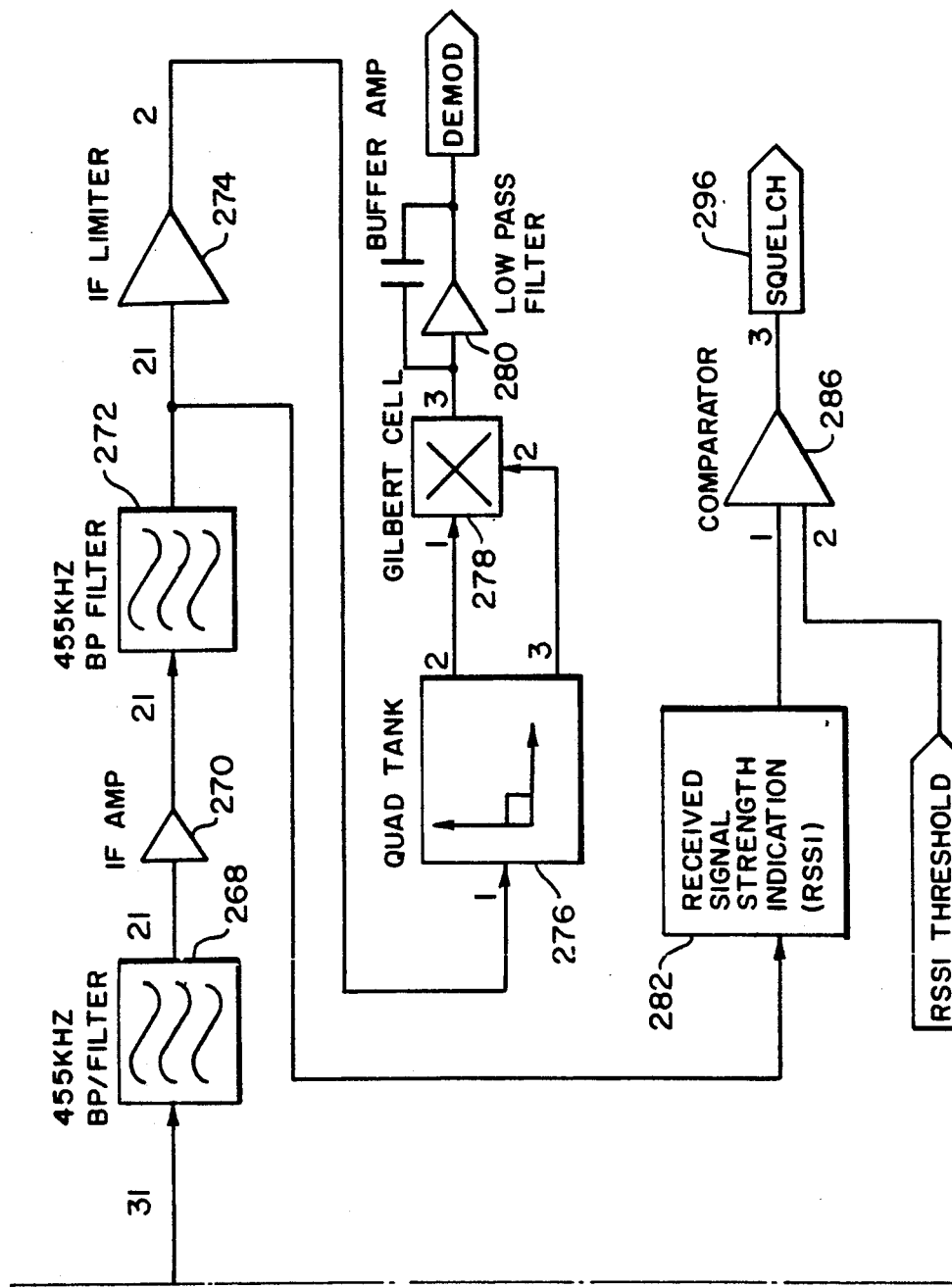

The received and demodulated audio signal 200 from FIG. 12 is conditioned by bandpass filter 202, de-emphasis circuitry 204 and expander 206, and is summed with any tone generator output at summer 208. The composite signal is then passed through electronic volume control 210 and to earphone driver 212, which has the capacity to drive both low and high impedance earphones at 214. Modulation detection circuitry 216 is also provided for the demodulated received signal to allow the presence of received audio to serve as a trigger signal 298 for the RSSI.

The demodulated received audio 200, along with the output of tone generator 198 and the processed voice signal are all combined by summing circuit 216, along with the modulated net data signal 218, if present, to provide a composite signal 216, which is fed to the transmitter circuitry. The audio signal from the microphone 182 may also be fed to voice actuated switch 222 to provide an appropriate output 290 to trigger hands-free transmissions.

The modulated signal 220 is passed through electronic level control 224, which is controlled by a modulation level control signal 226 produced by the microprocessor. The output of electronic level control 224 is utilized to modulate the rf carrier signal produced by frequency synthesizer 234, again under the control of the microprocessor. The synthesizer provides a confirm signal 232 when frequency lock is obtained. The output of the synthesizer passes through power splitter 236 to drive the alternative of a one-watt radio frequency amplifier 240 or a ten-miliwatt amplifier 246, depending upon the output level desired. The input to the high-power amplifier 240 is controlled by electronic level control 238, which is provided with a power level control signal 240 from the microprocessor to allow active adjustment of the rf output. The outputs of the radio frequency amplifiers are filtered at 242 and 248, after which they are passed to antennas 244, 250, respectively. In actuality, the two antennas may be one, with appropriate coupling between the amplifier outputs.

On the receiving side, as depicted in FIG. 12, broadcast signals are received by antenna 252, which may be in practice combined with antenna(s) 244, 250, filtered and amplified at 254 and 256, respectively, and then combined with the synthesized rf frequency output of synthesizer 266 in mixer 258 to provide a difference signal which is filtered at 260 and combined with the intermediate frequency output of local oscillator 264. Frequency lock of the synthesizer is confirmed on line 292. The difference signal thus produced is again filtered and amplified at 268, 270 and 272,, limited at 274, demodulated at 276 and 278, and filtered at 280 to provide the fully demodulated audio signal. As shown, the receiver is of a dual conversion superheterodyne design, as known in the art.

The output of bandpass filter 272 is also fed to receive signal strength indication (RSSI) circuitry 282, which is combined to a microprocessor-generated RSSI threshold reference signal 284 in comparator 286, which generates a squelch output 296 which is provided to the microprocessor. This signal is utilized to determine whether a station carrier signal is being received.

Figure 13:
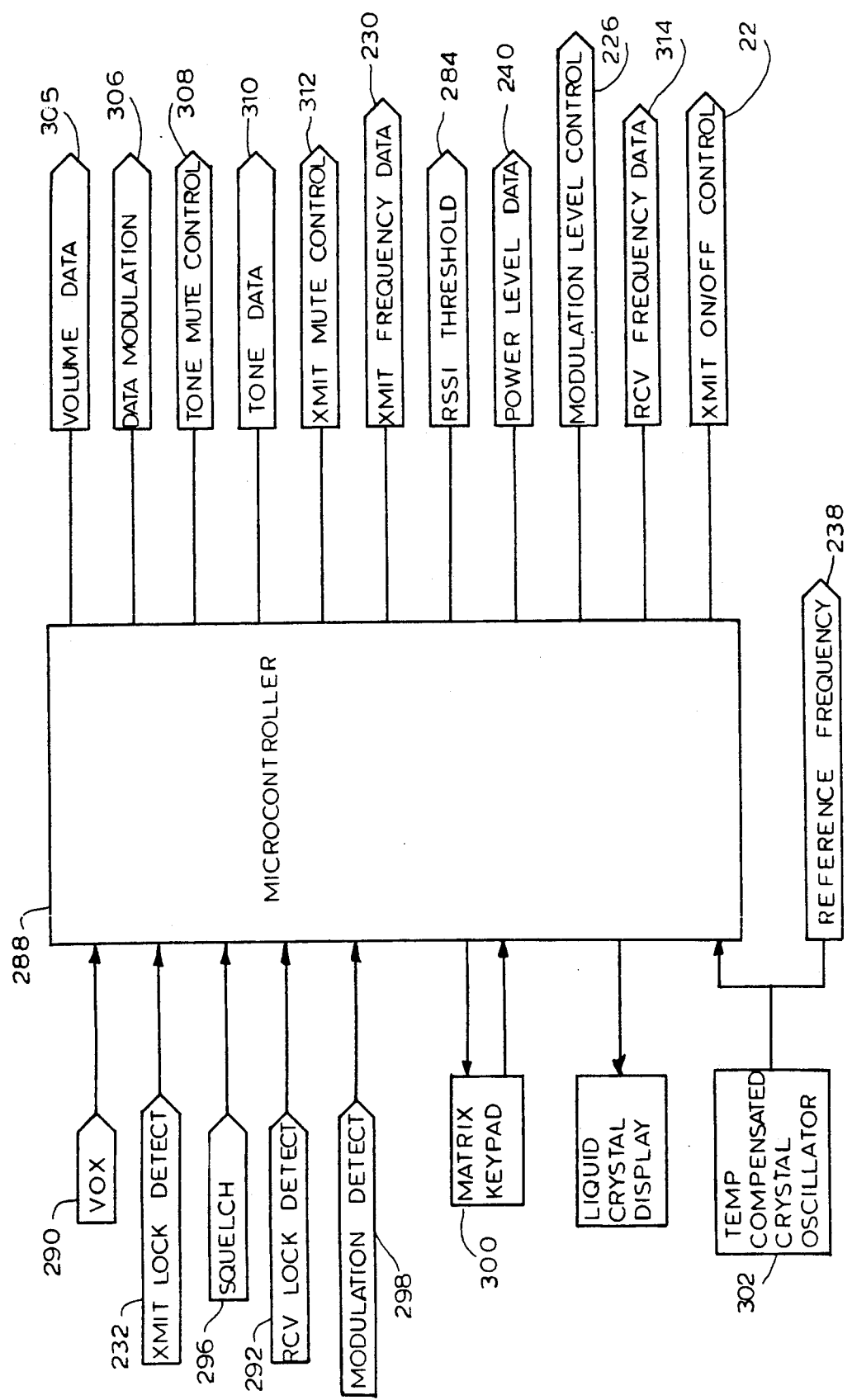
FIG. 13 illustrates the interface signals between a station microprocessor and other circuits.

FIG. 13 illustrates the active inputs and outputs for the microprocessor 288. As may be seen, the voice operated transmit signal 290 transmitter and receiver frequency lock detection signals 232, 292 squelch signal 296 and modulation detection signal 198 are used as inputs, along with keypad 300 and reference oscillator 302, whereby a variety of outputs, depicted on the right side of the figure, are produced on an active basis. Oscillator 302 also generates the reference frequency 238 for the transmit and receive synthesizers 234 and 266. By the use of appropriate programming techniques as known in the art.

FIG. 14 represents a typical arrangement of the frequencies employed by a typical six-station net. Each channel is in actuality composed of six discreet frequencies, 25 kHz apart and spanning a total frequency range of 125 kHz. Each frequency of the channel is assigned to a separate station of the net. Hopping of all stations occur between the assigned frequencies of the channels, which are separated from each other by 50 kHz. As shown, 128 channels may be utilized for hopping, the stations of a net hopping in synchronism among the channels in a pseudo-random order according to an algorithm executed by microprocessor 288. Channels 129 through 126 are designated as control channels, one of which is assigned to the net and serves as the broadcast channel for net information by the master station, and another of which serves as the beacon frequency broadcast by a station attempting to join a net.

By virtue of the present invention, full-duplex wireless communications may be obtained among a plurality of stations with a high degree of privacy and reliability. the system allows multiple nets to function in the same geographic area without significant risk of communication overlap or interference, and with the flexibility allowing dynamic reconfiguration of the net on an active basis to accommodate the loss or addition of stations.

We claim:

1. Apparatus for conducting wireless communication among a plurality of stations, comprising a transmitter tuned to a transmit frequency and a receiver tuned to a receive frequency at each station, said stations being arranged in a logical loop configuration whereby the receive frequency of the receiver of a given station corresponds to the transmit frequency of the transmitter of the station preceding it within the loop, each of said transmit frequencies for the stations of the loop being different; means at each station for generating a station audio-containing data signal for transmission by said transmitter to the next station receiver; means coupled to said station data signal generator, said station receiver and said station transmitter for combining the signal received by said station receiver with said station data signal for transmission by said station transmitter; timing means for maintaining a common time base among each of said stations; and means for varying the transmit and receive frequencies of each of said stations in synchronism on a continuous basis whereby communication is maintained among all stations.

2. The apparatus of claim 1, wherein said means for varying said first and second frequencies in synchronism comprises synchronous time base generation means located at each station.

3. The apparatus of claim 1, wherein said transmitters and receivers are fm.

4. The apparatus of claim 1, wherein said means for varying said frequencies comprises means to change frequency on a periodic basis among a set number of frequencies, the order of frequencies being determined on a pseudo-random basis.

5. The apparatus of claim 1, wherein said means for combining the received signal with the station data signal comprises means for attenuating the level of the received signal relative to the station data signal.

6. The apparatus of claim 1 further comprising means to retune a given station receiver to a new receive frequency corresponding to the transmit frequency of another station of the loop upon loss of signal by said given station's receiver.

7. The apparatus of claim 4 further comprising means at one of said stations for generating a coordinating signal for transmitter and receiver retuning.

8. The apparatus of claim 7, wherein said coordinating signal generating means comprises means to generate a net identification number, each of the other stations of said loop comprising means for receiving said net identification number and verifying that the net identification number received corresponds to an authorized number for the station.

9. The apparatus of claim 4, wherein each station transmitter is adapted to broadcast a continuous carrier.

10. The apparatus of claim 8, wherein said predetermined set of frequencies includes a frequency reserved for said coordinating signal.

11. The apparatus of claim 10 further comprising means at each of said other stations for transmitting an inquiry signal, said coordinating signal generating means comprising means to generate said coordinating signal in response to said inquiry signal transmitted from a one of said other stations.

12. The system of claim 11, wherein said retuning means comprises means to maintain synchronism among the predetermined set of frequencies during broadcast of said coordinating signal.

13. The apparatus of claim 11, wherein said means for transmitting an inquiry signal comprise means for generating said inquiry signal upon station initialization.

14. The apparatus of claim 1, wherein said means for generating a station audio-containing signal comprises a microphone circuit.

15. The apparatus of claim 11, wherein said inquiry signal is in the form of a carrier signal.

* * * * *